No. 859,229. PATENTED JULY 9, 1907.
V. V. JONES.
CAR REPLACER.
APPLICATION FILED DEC. 24, 1906.
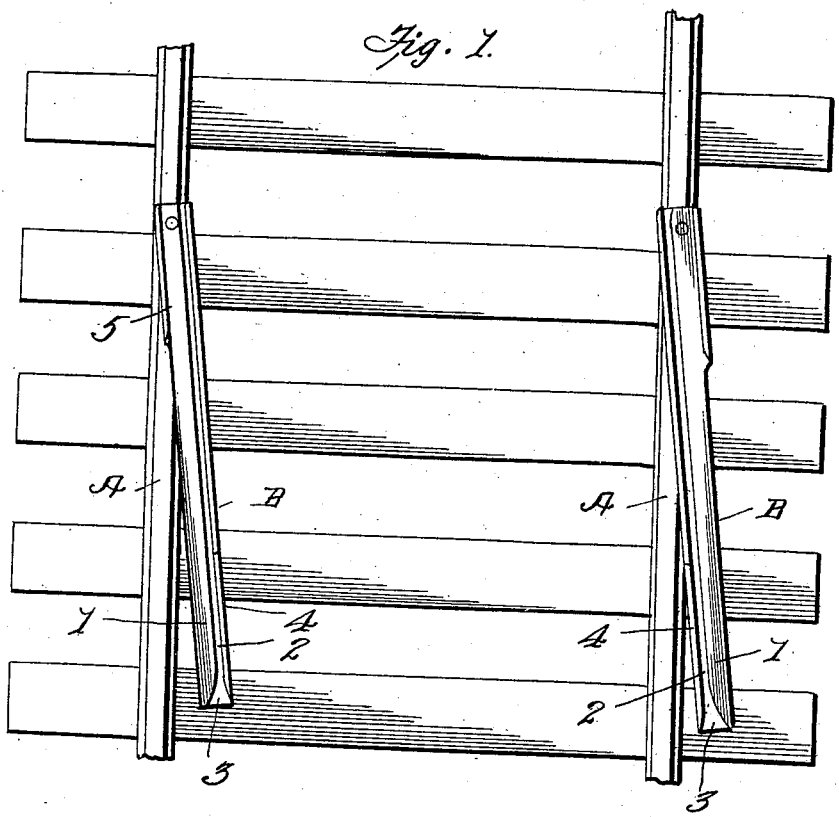
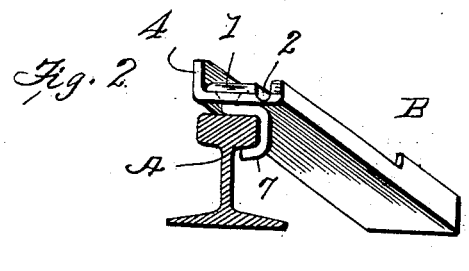
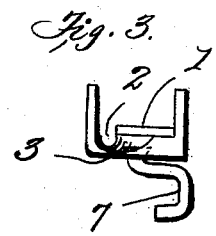
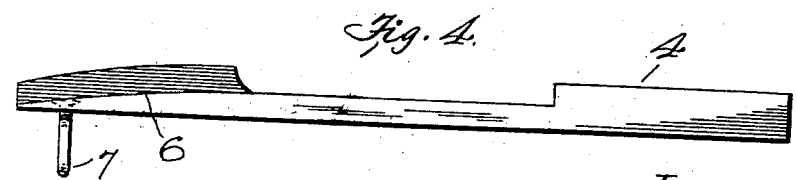
Witnesses.
Chas. K. Davis
John Powers.
Inventor.
Virgil V. Jones.
by Shepherd & Parker
Attorneys

UNITED STATES PATENT OFFICE.

VIRGIL V. JONES, OF HUDSON, SOUTH DAKOTA.

CAR-REPLACER.

No. 859,229.  Specification of Letters Patent.  Patented July 9, 1907.

Application filed December 24, 1906. Serial No. 349,222.

*To all whom it may concern:*

Be it known that I, VIRGIL V. JONES, a citizen of the United States, residing at Hudson, in the county of Lincoln and State of South Dakota, have invented certain new and useful Improvements in Car-Replacers, of which the following is a specification.

This invention relates to new and useful improvements in car replacers and it has particular reference to a car replacer of the rigid block type.

The invention aims as a primary object to provide a car replacer of the above type embodying a novel construction and arrangement of elements to accomplish the functions contemplated.

The detailed construction will appear in the course of the following description in which reference is had to the accompanying drawings forming a part of this specification, like characters of reference designating similar parts throughout the several views, wherein, Figure 1 is a plan view of parallel rails or tracks with a car replacer constructed in accordance with my invention applied thereto in position for use. Fig. 2 represents a rail or track in section and a car replacer applied thereto, said car replacer being shown in underneath perspective. Fig. 3 is an end elevation of my improved car replacer, and Fig. 4 is a side elevation thereof.

Referring specifically to the accompanying drawing the letter A designates the tracks or rails and the letter B my improved car replacer applied thereto. The car replacer B is constructed of an integral section of metal and in its upper surface has a tread portion 1 and a flange groove 2 parallel to said tread portion. The rear end of the groove 2 is enlarged or flared as at 3 to facilitate the passage of the wheel flange thereinto. Adjacent the rear end of the groove 2 there is an upstanding vertical flange 4 which engages the wheel flange to prevent displacement of the wheel. At the forward end of the car replacer adjacent the outer edge of the tread, there is a flange 5 which bears against the side of the wheel and has the same function as the flange 4. The forward end of the car replacer is curved downwardly as at 6 in order that the wheel may be the more easily guided upon the track or rail A.

It is preferred that the car replacer B be set at any desired angle with relation to said track and in such disposition be held from displacement. To this end a swiveled hook 7 depends from the forward end of the car replacer and is designed to engage the tread of the rail A as is clearly shown in Fig. 2. The devices are arranged in pairs as is shown in Fig. 1 and the members of the pair are disposed in the same relation as the opposed tracks or wheels, the grooves 2 being adjacent one another as will be readily understood.

While the elements herein shown and described are well adapted to serve the functions set forth, it is obvious that various minor changes may be made in the proportions, shape, and arrangement of the several parts without departing from the spirit and scope of the invention as defined in the appended claims.

Having fully described my invention, I claim:

1. A car replacer of the type set forth, comprising an integral section of material having a longitudinal tread portion and a longitudinal groove adjacent thereto, and having at its ends flanges arranged on opposite sides, respectively adjacent said tread portion and said groove.

2. A car replacer of the type set forth, comprising an integral section of material having a longitudinal tread portion and a longitudinal groove adjacent thereto and having at its ends flanges arranged on opposite sides, respectively adjacent said tread portion and said groove, said tread portion being curved downwardly as and for the purpose set forth.

3. A car replacer of the type set forth, comprising an integral section of material having a longitudinal tread portion and a longitudinal groove adjacent thereto, and a depending hook swiveled at one end of said tread portion.

In testimony whereof I affix my signature in presence of two witnesses.

VIRGIL V. JONES.

Witnesses:
 F. B. CUTLE,
 C. W. BECK.